United States Patent [19]

Victor et al.

[11] Patent Number: 5,282,365

[45] Date of Patent: Feb. 1, 1994

[54] PACKED COLUMN DISTILLATION SYSTEM

[75] Inventors: Richard A. Victor; Dante P. Bonaquist, both of Grand Island; Robert A. Beddome, Tonawanda, all of N.Y.

[73] Assignee: Praxair Technology, Inc., Danbury, Conn.

[21] Appl. No.: 977,463

[22] Filed: Nov. 17, 1992

[51] Int. Cl.$^5$ ............................................. F25J 3/04
[52] U.S. Cl. ................................. 62/22; 62/32; 62/34; 62/36; 62/40; 202/153; 202/158; 202/159
[58] Field of Search ............... 62/22, 32, 34, 36, 40; 202/153, 158, 159

[56] References Cited

U.S. PATENT DOCUMENTS

| | | | |
|---|---|---|---|
| 1,510,178 | 9/1924 | Lachmann | 62/34 X |
| 2,760,351 | 8/1956 | Schilling | 62/34 X |
| 3,083,545 | 4/1963 | Grossmann | 62/34 |
| 3,813,889 | 6/1974 | Allam et al. | 62/22 |
| 4,025,398 | 5/1977 | Haselden | 203/25 |
| 4,579,566 | 4/1986 | Brugerolle | 62/22 X |
| 4,615,770 | 10/1986 | Govind | 203/25 |
| 4,668,261 | 5/1987 | Chatzipetros et al. | 62/22 X |
| 4,681,661 | 7/1987 | Govind | 202/154 |
| 4,838,913 | 6/1989 | Victor et al. | 62/22 |
| 4,871,382 | 10/1989 | Thorogood et al. | 62/18 |
| 4,995,945 | 2/1991 | Craig | 202/159 X |
| 5,019,144 | 5/1991 | Victor et al. | 62/22 |
| 5,100,448 | 3/1992 | Lockett et al. | 62/24 |
| 5,114,449 | 5/1992 | Agrawal et al. | 62/22 |

Primary Examiner—Henry A. Bennet
Assistant Examiner—Christopher B. Kilner
Attorney, Agent, or Firm—Stanley Ktorides

[57] ABSTRACT

An improved packed column distillation system, which may be particularly advantageous for use with cryogenic distillation such as the cryogenic distillation of air, wherein external heat is provided at the column wall, especially at a stripping section of the column, to vaporize liquid formed on the inner surface of the column wall resulting in improved separation efficiency with lower packed bed height.

10 Claims, 4 Drawing Sheets

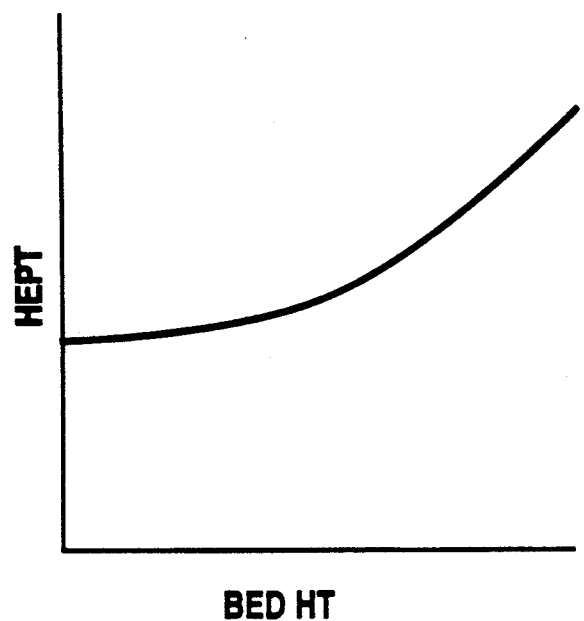
Fig. 4A
Fig. 4B
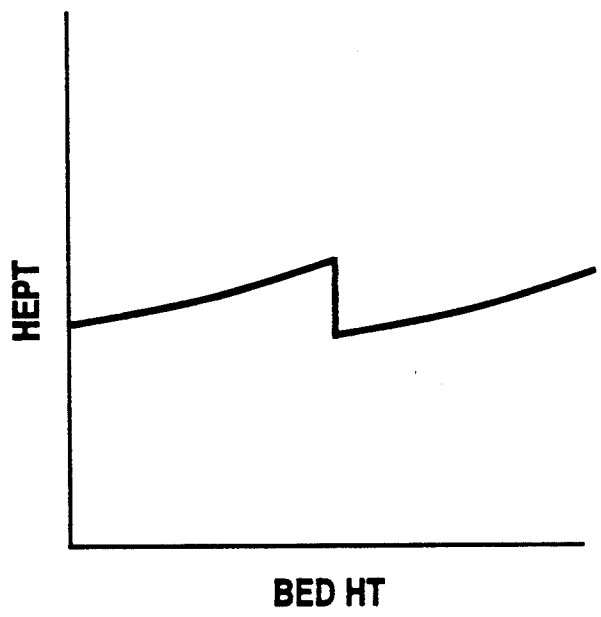
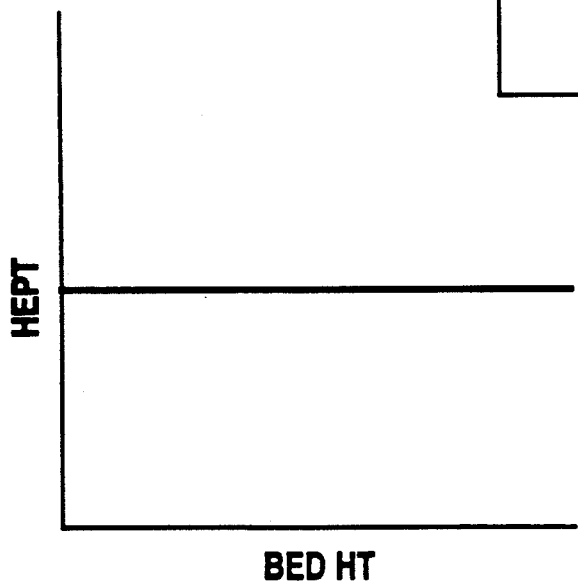
Fig. 4C

PACKED COLUMN DISTILLATION SYSTEM

TECHNICAL FIELD

This invention relates to distillation columns which utilize structured or random packing as vapor-liquid contact elements within the column.

BACKGROUND ART

Distillation of a fluid mixture, e.g., air, into two or more portions enriched in a respective mixture component, has generally been carried out employing one or more distillation columns which employ trays as the column internals or mass transfer elements. Recently there has developed an increasing use of packing as mass transfer elements in distillation columns because packing has a much lower pressure drop than does trays. Packing may be either structured or random packing. Structured packing is particularly preferred because it has more predictable performance than does random packing.

While packing has advantages over conventional trays in the operation of a distillation column, there has been experienced with packing a significant reduction in separation efficiency over that which would be expected theoretically. Applicants believe that these separation performance deficiencies are the result of liquid bypassing within a given packed section by flowing along the column wall. The path of least resistance for liquid in a packed column is down the wall of the column. Wall liquid has a much shorter residence time in the column than the bulk liquid which flows through a torturous path within the packing. Mass transfer between the wall liquid and bulk vapor will be less than the corresponding mass transfer between the bulk liquid and the bulk vapor. Hence, as one proceeds down the column wall of a distillation column, wall liquid will contain more of the low boiling or more volatile component relative to the bulk liquid. For example, in a typical cryogenic oxygen plant for the column section located above the main condenser separating a binary mixture of oxygen and argon using a column with structured packing, above the packing is a distributor containing liquid comprising from about 10 to 20 percent argon with the balance being primarily oxygen. Liquid flows from the distributor in a uniform fashion to the first element of packing. An element in this case being a 10 inch high layer of structured packing having corrugations that run at a 45° angle from the column axis. Some of this high argon content liquid is diverted by way of the corrugations to the column wall. This wall liquid flows in relatively fast moving rivulets with minimal surface area. These conditions lead to poor mass transfer efficiencies. The bulk liquid on the other hand spreads into thin slow moving films of substantial surface area which are ideal conditions for efficient mass transfer. Consequently, the wall liquid adjacent to the bottom of the first element will contain more argon, the low boiling component, than the bulk liquid leaving the packing. At the next element down, a portion of the wall liquid flows back into the packing. Some mass transfer occurs between the remaining wall liquid and the bulk vapor and some liquid of slightly lower argon concentration is added to the wall flow. The amount of wall liquid relative to bulk liquid increases as it descends. Again the wall liquid adjacent to the bottom of the second element will contain more argon than the bulk liquid leaving the packing. This process continues past subsequent elements to the bottom of the packed section. At this elevation, the wall liquid having substantial argon concentration compared to the bulk liquid, mixes with the bulk liquid leaving the packing. The argon concentration of the mixture is elevated compared to the bulk liquid so the apparent separation for this section is poor.

There are known in the art means for correcting liquid maldistribution within a packed column. For example, there has been proposed the use of liquid redistributors or trays between short packed column sections to collect and mix wall liquid with bulk liquid. However, the capital and process cost penalties are substantial. Further mixing of the wall liquid with the bulk liquid represents a thermodynamic irreversibility. Furthermore, costs are incurred due to the need for additional bed supports, collector trays, which collect wall liquid and mix it with bulk liquids, and a liquid distributor which is fed by the collector tray, the distributor providing uniform flow of the liquid to the subsequent packed bed. Also, additional column height is required, the cost of which includes additional welds, column material, insulation, ladders, platforms, etc. The foundation is ultimately effected. Another concern is the transfer of liquid within the plant when columns get too tall. Along with capital penalties there are process penalties involved with redistribution. In particular, redistributors add vapor phase pressure drop which must be overcome by additional feed pressure. Furthermore, redistributors do not add to the mass transfer potential of the column. From a fundamental perspective, a redistributor serves to mix liquid containing a relatively high concentration of the low boiling component (wall liquid) with the bulk liquid which contains the relatively low concentration of the low boiling component. The mixed liquid then undergoes further distillation in a subsequent packed section to reduce the concentration of the low boiling component in the liquid. The liquid mixing that occurs in a redistributor represents a thermodynamic irreversibility with a quantifiable process penalty. Combining this process penalty with the practical drawbacks and process penalties of liquid redistribution cited earlier provide substantial incentive for developing alternative means for dealing with wall flow.

Accordingly, it is an object of this invention to provide an improved packed column distillation system which can overcome the problems of liquid maldistribution cause by wall flow, without the need to resort to liquid redistributors or trays between packed column sections to collect and mix wall liquid with bulk liquid.

SUMMARY OF THE INVENTION

The above and other objects which will become apparent to one skilled in the art upon a reading of this disclosure are attained by the present invention, one aspect of which is:

A distillation column having a column wall and containing mass transfer elements comprising packing, characterized by means for providing external heat at the column wall.

Another aspect of the invention is:

A method for carrying out distillation comprising providing a distillation column having a column wall, passing vapor and liquid countercurrently in the column over mass transfer elements comprising packing and forming liquid on the inner surface of the column wall, characterized by providing external heat at the column wall in an amount sufficient to vaporize at least some of the liquid formed on the inner surface of the column wall.

The term "column" as used herein means a distillation or fractionation column or zone, i.e., a contacting column or zone wherein liquid and vapor phases are countercurrently contacted to effect separation of a fluid mixture, as for example, by contacting of the vapor and liquid phases on packing elements and/or on a series of vertically spaced trays or plates mounted within the column. For a further discussion of distillation columns see the Chemical Engineers, Handbook, Fifth Edition, edited by R. H. Perry and C. H. Chilton, McGraw-Hill Book Company, New York, Section 13, "Distillation" B. D. Smith, et al., page 13-3 *The Continuous Distillation Process*. The term, double column is used herein to mean a higher pressure column having its upper end in heat exchange relation with the lower end of a lower pressure column. A further discussion of double columns appears in Ruheman "The Separation of Gases" Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the volatile component(s) in the vapor phase and thereby the less volatile component(s) in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is adiabatic and can include integral or differential contact between the phases. Separation process arrangements that utilize the principles of rectification to separate mixtures are often interchangeably termed rectification columns, distillation columns, or fractionation columns.

The term "indirect heat exchange", as used herein means the bringing of two fluid streams into heat exchange relation without any physical contact or intermixing of the fluids with each other.

As used herein, the term "packing" means any solid or hollow body of predetermined configuration, size, and shape used as column internals to provide surface area for the liquid to allow mass transfer at the liquid-vapor interface during countercurrent flow of the two phases.

As used herein the term "random packing" means packing wherein individual members have no specific orientation relative to each other and to the column axis.

As used herein, the term "external heat" means heat from outside the confines of the column and in an amount sufficient to vaporize at least some of the liquid formed on the inner surface of the column wall.

As used herein, the term "stripping section" means a section of a column wherein the less volatile components are concentrated in the liquid phase and the more volatile components are stripped from the liquid by upflowing vapor.

As used herein, the term "HETP" means the height of packing over which a composition change is achieved which is equivalent to the composition change achieved by a theoretical plate.

As used herein, the term "theoretical plate" means a contact process between vapor and liquid such that the exiting vapor and liquid streams are in equilibrium.

As used herein, the term "structured packing" means packing wherein individual members have specific orientation relative to each other and to the column axis. Examples of structured packing are disclosed in U.S. Pat. No. 4,186,159—Huber, U.S. Pat. No. 4,296,050—Meier, U.S. Pat. No. 4,929,399—Lockett, et al. and U.S. Pat. No. 5,132,056—Lockett et al.

BRIEF DESCRIPTION OF THE DRAWINGS

FIGS. 4A, 4B and 4C are graphical representations of the relationship of HETP and bed height respectively for a conventional packed column, for a packed column with redistributors and for a packed column of this invention.

DETAILED DESCRIPTION

The invention overcomes the problems of poor separation in a distillation column caused by liquid forming or flowing on the column walls by vaporizing at least some of the liquid before it can bypass the mass transfer elements. Although only a portion of the wall liquid may be vaporized, the resultant upwardly flowing vapor causes the remaining liquid to flow back to the packing. In this way mixing of wall liquid with bulk liquid within the column which represents a thermodynamic irreversibility is reduced or is completely avoided.

The invention may be practiced in conjunction with the fractional distillation of any multicomponent mixture. Examples include the distillation of mixtures comprising oxygen and nitrogen, oxygen and argon, ethylbenzene and styrene, propylene and propane, ethylene and ethane, and volatile organic compounds and water. This invention will probably find particular utility in cryogenic distillation, such as the cryogenic distillation of air into its components, because a smaller quantity of heat is required to vaporize a cryogenic liquid than would be required to vaporize a comparable quantity of a non-cryogenic liquid. Cryogenic distillation is a distillation process carried out, at least in part, at low temperatures, such as at temperatures at or below 150 degrees K.

Figure 1:
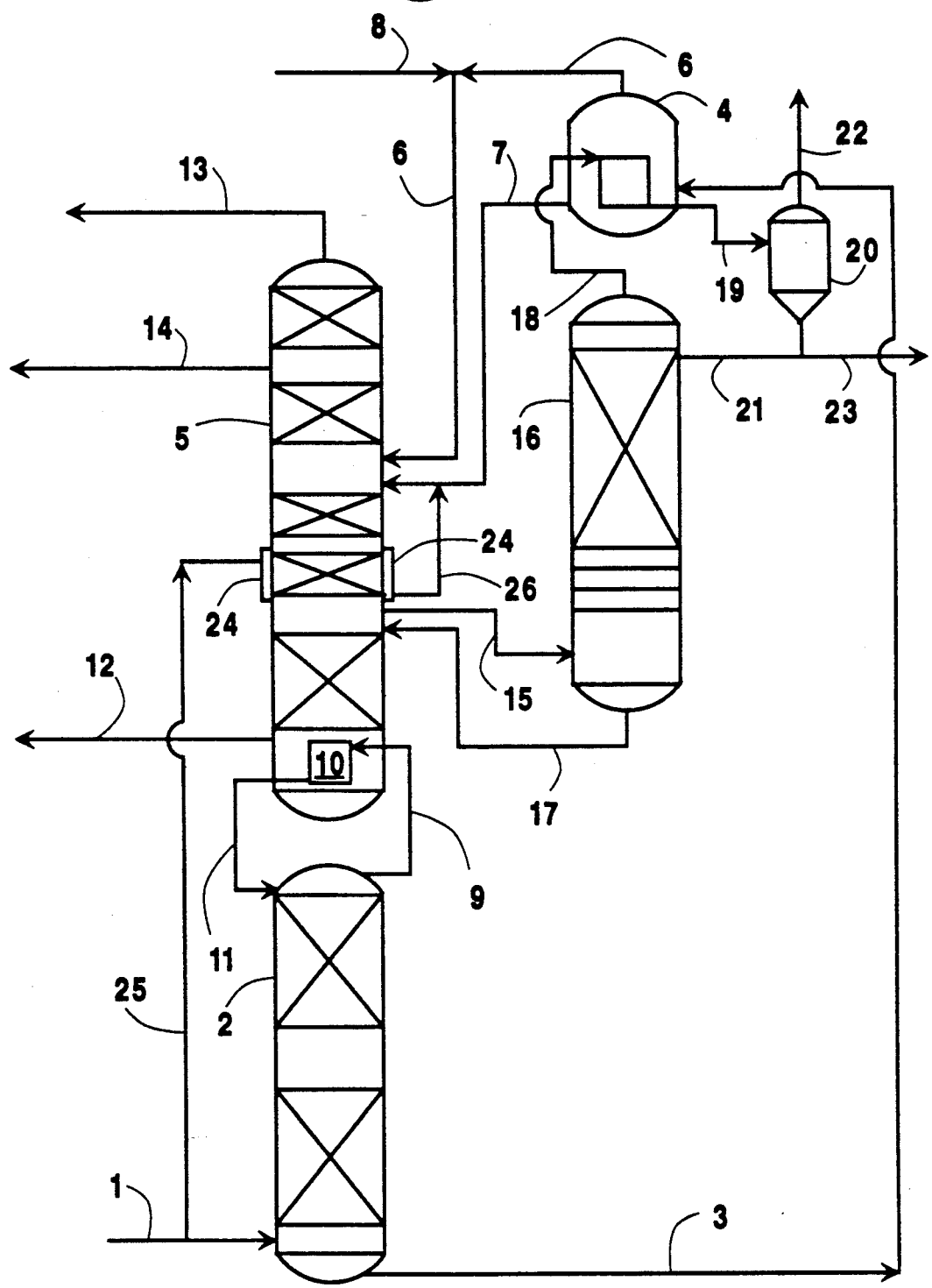
FIG. 1 is a schematic representation of a preferred embodiment of the improved packed column distillation system of this invention wherein a process stream provides external heat to the column wall at a stripping section by passing through a heating jacket.

FIG. 1 is a simplified schematic representation of one preferred embodiment of the invention employed in conjunction with a cryogenic air separation plant employing a double column with an associated argon column which produces oxygen, nitrogen and crude argon by the cryogenic distillation of feed air.

Referring now to FIG. 1, feed air 1 which has been compressed, cooled and cleaned of high boiling impurities such as water vapor and carbon dioxide is passed into column 2 which is the higher pressure column of a double column system. Within column 2 the feed air is separated by cryogenic distillation into nitrogen-enriched vapor and oxygen-enriched liquid. Oxygen-enriched liquid is passed in line 3 from the lower portion of column 2 into argon column top condenser 4 wherein it is partially vaporized against argon column top vapor. The resulting vapor and remaining liquid are passed from top condenser 4 into lower pressure column 5 as steams 6 and 7 respectively. If desired, a portion of the cleaned, cooled and compressed feed air may be turbo-expanded to generate refrigeration and passed into column 5 as additional feed either directly or, as illustrated in FIG. 1, as stream 8 added to stream 6.

Nitrogen-enriched vapor is passed as stream 9 into main condenser 10 wherein it is condensed by indirect heat exchange with column 5 bottom liquid. The resulting liquid is passed as stream 11 back into column 2 as reflux. If desired, a portion of the resulting liquid may be passed into column 5 as reflux. Also, if desired, a portion of the resulting liquid may be recovered as product liquid nitrogen.

Column 5 is the lower pressure column of the double column system and is operating at a pressure less than that of column 2. Within column 5 the various feeds are separated by cryogenic distillation into oxygen-rich and nitrogen-rich fluids. The separation is carried out at least in part using mass transfer elements comprising packing. Preferably the packing is structured packing. Oxygen-rich vapor is passed out of column 5 as stream 12 and recovered as product oxygen gas. If desired oxygen-rich liquid may also be recovered from column 5. Nitrogen-rich vapor is passed out of column 5 as stream 13 and recovered as product nitrogen gas. A waste stream 14 is also removed from column 5 below the point from where stream 13 is taken for product purity purposes.

A stream 15 comprising primarily oxygen and argon is passed from column 5 into argon column 16. Within argon column 16 the fluid fed into the column is separated by cryogenic distillation into argon-richer vapor and oxygen-richer liquid. Preferably the argon column internals or mass transfer elements comprise packing, most preferably structured packing. In the embodiment illustrated in FIG. 1 the argon column also uses trays as mass transfer elements in the lower portion of the column. Oxygen-richer liquid is passed out from argon column 16 into column 5 as stream 17. Argon-richer vapor is passed as stream 18 into top condenser 4 wherein it is partially condensed by indirect heat exchange with partially vaporizing oxygen-enriched liquid as was previously described. The resulting two phase stream 19 is passed into phase separator 20 from which liquid stream 21 is passed into column 16 as reflux. Also from phase separator 20 vapor stream 22 and liquid stream 23 are withdrawn and recovered as crude argon.

In the embodiment illustrated in FIG. 1, the means for providing external heat to column 5 is a jacket 24 around a stripping section of column 5. The jacket is fed by a vapor stream which is cooled and preferably condensed within the jacket thus providing heat at the wall of column 5. The jacket may be around any height of the column including its entire height rather than just around this stripping section of the column. In the embodiment illustrated in FIG. 1, a stream of feed air 25 is passed into jacket 24 wherein it is condensed thus serving to provide external heat to the outer wall surface of column 5. The heat is conducted through the wall of column 5. Liquid is formed on the inner surface of column 5. Generally, the liquid formed on the inner surface of the column wall is from flow from above the column section and/or from the column internals at that section. The heat conducted through the column wall serves to vaporize some or all of the liquid formed on the inner surface of the column wall. The condensed feed air stream is passed out of jacket 24 as stream 26 and preferably, as illustrated in FIG. 1, passed into the column. In the embodiment illustrated in FIG. 1, stream 26 is combined with stream 7 prior to passage into column 5.

Figure 2:
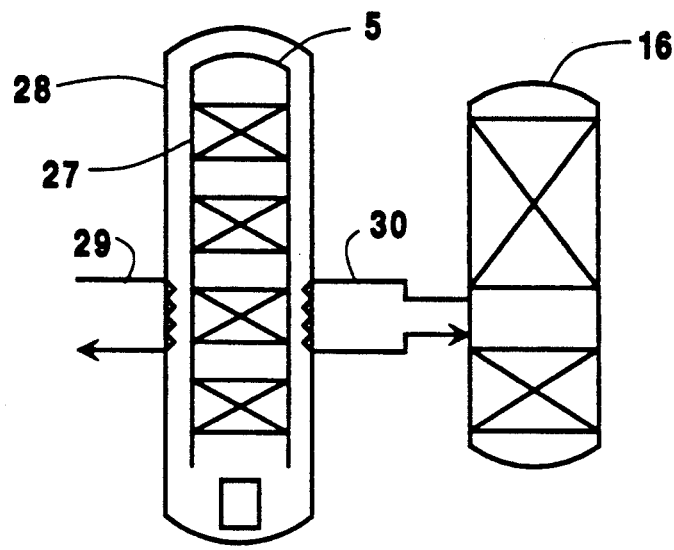
FIG. 2 is a simplified representation of a double walled column wherein heat is provided to the annular space between the walls.

Although the embodiment illustrated in FIG. 1 employs a feed air stream to provide external heat to the jacket, any effective process stream may be used, such as a gaseous nitrogen stream taken from the higher pressure column, a desuperheating turbine air stream or a stream taken from the argon column. These various alternatives are illustrated in simplified schematic form in FIG. 2.

Any other effective means for providing external heat to the column wall, such as electrical resistance heating of the column wall, may also be employed in the practice of this invention.

External heat means heat provided from outside the column and is differentiated from heat which is normally exchanged between the upflowing vapor and the downflowing liquid within the column. The external heat may be provided at the outer surface of the column wall or it may be brought into the column and provided at the inner surface of the column wall.

In the most preferred embodiment of the invention, the column is a double-walled column and a process stream is passed through the annular space between the double walls wherein it undergoes cooling such as condensation or desuperheating so as to provide external heat to the column wall. This double-walled arrangement is shown in simplified schematic form in FIG. 2 wherein lower pressure column 5 is illustrated as having an internal wall 27 and an external wall 28. Vapor is passed into the annular space between walls 27 and 28 and passes external heat to the outer surface of wall 27 and from there into the column to vaporize liquid on the inner surface of wall 27 in the manner previously described. The vapor may be from any source such as desuperheating turbine air, condensing feed air, condensing higher pressure column nitrogen or oxygen-rich vapor from the lower portion of the lower pressure column, all of which are exemplified in generalized form by stream 29 of FIG. 2. The vapor may also be from argon column 16 as shown by stream 30. Argon column top vapor could also be used as a heat source. Condensing vapor taken from an intermediate point of the argon column by vaporizing liquid on the column wall inner surface below the feed to the lower pressure column will reduce concentration gradients in both columns and increase the recovery of argon.

As mentioned the double-walled column embodiment is the most preferred embodiment for carrying out the invention. When the jacket illustrated in FIG. 1 runs the entire height of the column, it effectively becomes a double walled column similar to that illustrated in FIG. 2. In either the double-walled column or jacket embodiment, a process stream is introduced to the annular space. Condensation of the process stream on the column wall provides the necessary heat flux to boil the column liquid flowing on the inside of the column wall. Use of an annular space has a particular advantage in that the condensing stream can locate cold streaks on the outer surface of the column wall caused by liquid rivulets flowing on the inside of the column. These liquid rivulets represent or will contain low boiling components and will have the lowest temperature. Condensing vapor will accumulate at these cold spots on the column wall outer surface because they represent regions of maximum thermal driving force or maximum $\Delta T$ between the boiling and condensing streams. Vapor to be condensed is introduced preferably at the top of the wall jacket or annular space at various points around the circumference. Vapor flows into the space and immediately seeks the cold wall and condenses. The condensate runs down the wall on the outside of the column and is collected at the bottom and drained off into a separator. Liquid may then be transferred back to a point in the column or into a crude condenser where it ultimately passe through the distillation process. Heat duty can be set or controlled by pressure control or flow control of the condensing stream.

As the alternative to the double wall or jacket, one could use channels welded to the column wall which allow the condensing or process stream or any heat source stream to flow. These channels could run either the length of the column or in a circumferential fashion. However, they will not effectively chase rivulets that could occur in between the channels.

Figure 5:
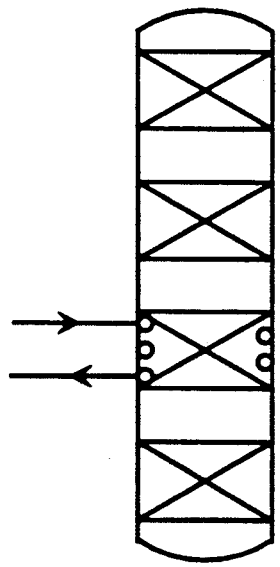
FIG. 5 is a simplified representation of a column wherein external heat is provided at the inner surface of the column wall.

Another alternative embodiment of the invention comprises the use of conduit means such as heat tracer bands or tubes passing between the packing and the column inner wall. A process stream would flow within the bands or tubes providing heat at the inner surface of the column wall to vaporize liquid formed on the column wall. This embodiment is illustrated in simplified form in FIG. 5.

The advantageous results attainable with the invention are illustrated in FIGS. 3 and 4 which illustrate comparisons of the calculated results attained with the invention with those attained with conventional columns and with columns which employ redistributors.

Figure 3A:
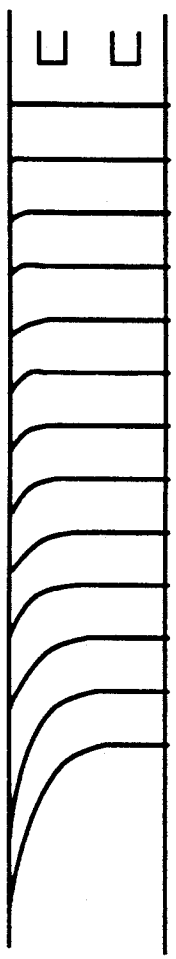
FIGS. 3A, 3B and 3C represent liquid phase temperature profiles within a column respectively for a conventional packed column, for a packed column with redistributors and for the packed column of this invention.
Figure 3B:
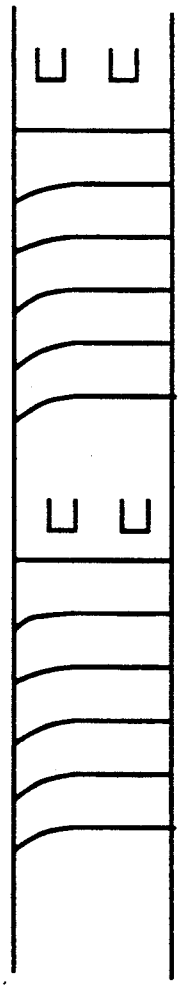
Figure 3C:
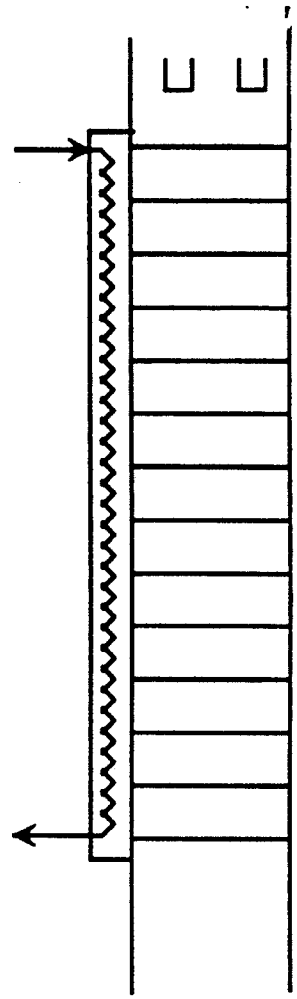

FIG. 3 shows temperature profiles for the liquid phase for three packed column configurations. FIG. 3A illustrates the conventional packed column configuration without liquid redistribution. FIG. 3B shows temperature profiles with liquid redistribution and FIG. 3C shows temperature profiles with the process of the invention. The temperature profiles are a direct indication of the separation efficiencies that can be achieved. A flat isotherm, shown in FIG. 3C, is the ideal or desired state. The sagging temperature isotherms indicated in FIGS. 3A and 3B are indicative of the high content of the low boiling component near the column wall. The liquid redistribution deals with wall flow by periodically remixing the bulk liquid and the wall liquid thereby producing a flat temperature isotherm at the top of the column section following redistribution. The temperature profile, however, rapidly degrades following redistribution as one moves down the bed. This is in contrast to the practice of the invention shown in FIG. 3C where the flat temperature isotherm is maintained over the entire length of the bed. A key advantage of the invention is that separation efficiency is relatively constant over the entire length of the packed section. FIG. 4 illustrates HETP plotted against bed height for the three cases illustrated in FIG. 3. In FIGS. 4A and 4B HETP degrades rapidly, that is, increases as bed height increases. Redistribution allows lower average values of HETP to be achieved. However, with the invention as shown in FIG. 4C, HETP is relatively constant over very tall packed sections. Consequently, separating requirements are met with relatively short (low HETP) packed beds. In summary, the invention allows low HETP's to be achieved without redistribution.

Now with the practice of this invention one can operate a packed distillation column with improved separation efficiency than is possible with conventional known systems. Although the invention has been described in detail with reference to certain preferred embodiments, those skilled in the art will recognize that there are other embodiments of the invention within the scope and the spirit of the claims.

We claim:

1. A method for carrying out distillation comprising providing a distillation column having a column wall with an inner surface and an outer surface, passing vapor and liquid countercurrently in the column over mass transfer elements comprising packing and forming liquid on the inner surface of the column wall, characterized by providing external heat at the column wall by condensing fluid on the column wall in an amount sufficient to vaporize at least some of the liquid formed on the inner surface of the column wall.

2. The method of claim 1 wherein at least some of said condensed fluid is passed into the column.

3. The method of claim 1 wherein the distillation method is the cryogenic distillation of air carried out with a double column system having a lower pressure column and a higher pressure column having a feed air stream and the column is the lower pressure column of the double column system.

4. The method of claim 3 wherein the fluid is taken from the feed air stream to the higher pressure column.

5. The method of claim 3 wherein the fluid is taken from at least one of the higher pressure column and the lower pressure column.

6. The method of claim 3 further comprising the use of an argon column wherein the fluid is taken from the argon column.

7. The method of claim 6 wherein condensed fluid is returned to the argon column.

8. The method of claim 1 wherein the external heat is provided at the outer surface of the column wall.

9. The method of claim 1 wherein the external heat is provided at the inner surface of the column wall.

10. The method of claim 1 wherein the vapor and liquid passed countercurrently in the column comprises at least two of oxygen, nitrogen and argon.

* * * * *